(12) United States Patent
Shimasaki et al.

(10) Patent No.: US 12,352,225 B1
(45) Date of Patent: Jul. 8, 2025

(54) VEHICLE

(71) Applicant: TOYOTA JIDOSHA KABUSHIKI KAISHA, Toyota (JP)

(72) Inventors: Shinobu Shimasaki, Toyota (JP); Takahiro Nakajima, Toyota (JP); Toshinori Oki, Toyota (JP); Tatsuo Iida, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/934,428

(22) Filed: Nov. 1, 2024

(30) Foreign Application Priority Data

Feb. 29, 2024 (JP) ................................ 2024-030525

(51) Int. Cl.
*F02M 26/15* (2016.01)
*F01N 13/00* (2010.01)
*F01N 13/14* (2010.01)

(52) U.S. Cl.
CPC .......... *F02M 26/15* (2016.02); *F01N 13/0097* (2014.06); *F01N 13/14* (2013.01); *F01N 2470/20* (2013.01)

(58) Field of Classification Search
CPC ..... F02M 26/15; F01N 13/0097; F01N 13/14; F01N 2470/20
See application file for complete search history.

(56) References Cited

U.S. PATENT DOCUMENTS

| | | | |
|---|---|---|---|
| 7,104,051 B2 * | 9/2006 | Shimasaki | F02D 41/029 60/303 |
| 11,391,229 B2 * | 7/2022 | Cox | F02D 9/02 |
| 11,549,453 B2 * | 1/2023 | Blei | F02M 26/06 |
| 2014/0047817 A1 * | 2/2014 | Vigild | F02M 26/15 60/273 |
| 2014/0292350 A1 * | 10/2014 | Yoshioka | F01N 9/00 324/551 |
| 2023/0042626 A1 * | 2/2023 | Kitaura | F02D 41/024 |

FOREIGN PATENT DOCUMENTS

| | | | | |
|---|---|---|---|---|
| DE | 102010025699 A1 * | 1/2012 | ......... | F01N 13/0097 |
| DE | 102017205696 A1 * | 10/2018 | | |
| EP | 1422412 A2 * | 5/2004 | ............ | F02M 26/12 |
| JP | 2011202607 A * | 10/2011 | | |

OTHER PUBLICATIONS

DE102017205696 Translation (Year: 2017).*
JP 2011202607 Translation (Year: 2011).*

* cited by examiner

Primary Examiner — Jesse S Bogue
(74) Attorney, Agent, or Firm — SoraIP, Inc.

(57) ABSTRACT

A vehicle includes: an EHC which is provided in an exhaust passage of an internal combustion engine and of which the temperature can be raised by application of a current; a tubular first case housing the EHC; an insulation coat disposed between an inner wall of the first case and an outer circumference of the EHC so as to surround the outer circumference of the EHC; a constricted part that is provided at an end portion of the first case on a downstream side in a flow direction of an exhaust gas to reduce the inside diameter of the first case along the flow direction; and an EGR passage connected to the constricted part.

10 Claims, 3 Drawing Sheets

VEHICLE

CROSS-REFERENCE TO RELATED APPLICATION

This application claims priority to Japanese Patent Application No. 2024-030525 filed on Feb. 29, 2024, incorporated herein by reference in its entirety.

BACKGROUND

1. Technical Field

This disclosure relates to a vehicle.

2. Description of Related Art

Japanese Unexamined Patent Application Publication No. 2011-202607 (JP 2011-202607 A) discloses a configuration of an exhaust system of an internal combustion engine of a vehicle in which a takeout port for exhaust gas recirculation (EGR) is provided downstream of an electrically heated catalyst (EHC; a catalyst of which the temperature can be raised by application of a current) and an oxidation catalyst.

SUMMARY

One conceivable measure to secure insulation between an electrode and a base material of an EHC on one side and a case housing the EHC on the other side is to apply an insulation coat to an outer circumferential side of the EHC. However, there is a concern that insulation properties may degrade due to build-up of soot on the insulation coat, and an EGR-equipped vehicle like the one described in JP 2011-202607 A has room for improvement.

An object of this disclosure is to provide a vehicle that can inhibit degradation of the insulation properties of an EHC.

A vehicle according to one aspect of embodiments of the present disclosure includes: an exhaust gas control catalyst which is provided in an exhaust passage of an internal combustion engine and of which the temperature can be raised by application of a current; a tubular case housing the exhaust gas control catalyst; an insulation coat disposed between an inner wall of the case and an outer circumference of the exhaust gas control catalyst so as to surround the outer circumference of the exhaust gas control catalyst; a constricted part that is provided at an end portion of the case on a downstream side in a flow direction of an exhaust gas to reduce the inside diameter of the case along the flow direction; and an EGR passage connected to the constricted part.

According to this disclosure, a vehicle that can inhibit degradation of the insulation properties of an EHC can be provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In the following, an embodiment will be described with reference to the accompanying drawings. To facilitate understanding of the description, the same constituent elements will be denoted by the same reference signs throughout the drawings as far as possible, while overlapping description thereof will be omitted.

Figure 1:
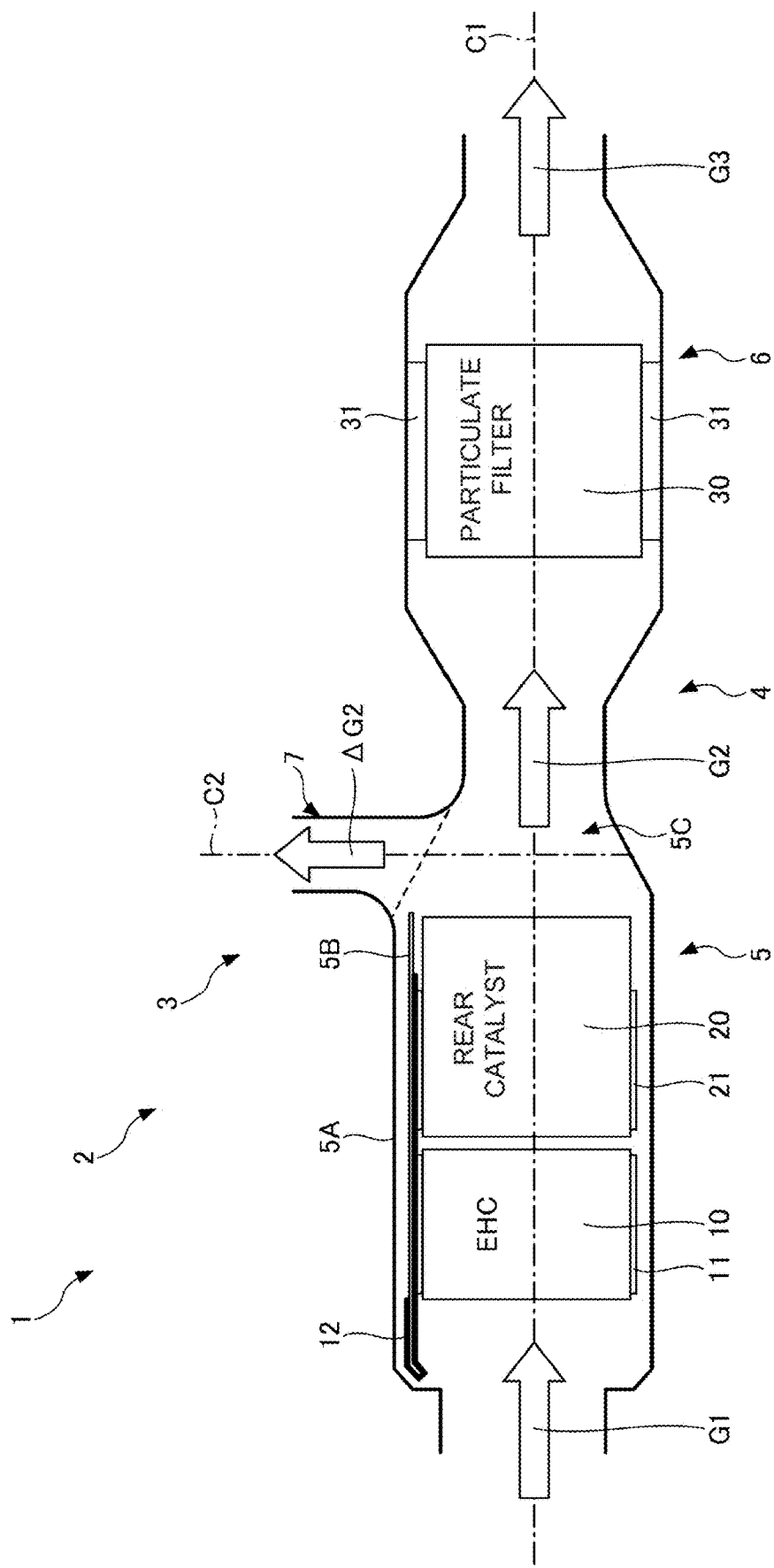
FIG. 1 is a view showing the configuration of an exhaust passage of a vehicle according to an embodiment in the vicinity of an EHC.

FIG. 1 is a view showing the configuration of an exhaust passage 3 of a vehicle 1 according to the embodiment in the vicinity of an EHC 10.

The vehicle 1 is equipped with an internal combustion engine 2 as a travel driving source. The internal combustion engine 2 takes air into an engine main body through an intake passage (not shown) and combusts an air-fuel mixture of fuel and the intake air in the engine main body to generate a driving force. The internal combustion engine 2 discharges an exhaust gas after the combustion through the exhaust passage 3.

As shown in FIG. 1, in the exhaust passage 3, a catalytic converter 4 for reducing pollutants in the exhaust gas is provided. In FIG. 1, the left side of the view is an upstream side in a flow direction of the exhaust gas and the right side is a downstream side. In FIG. 1, main flows of the exhaust gas inside the exhaust passage 3 are indicated by arrows G1, G2, and G3.

In the example of FIG. 1, the catalytic converter 4 has a first case 5 that is disposed on the upstream side in the flow direction of the exhaust gas, and a second case 6 that is disposed on the downstream side relative to the first case 5. The first case 5 has a tubular shape, and houses an exhaust gas control catalyst of which the temperature can be raised by application of a current, i.e., an electrically heated catalyst (EHC) 10, and a rear catalyst 20 disposed on the downstream side in the flow direction relative to the EHC 10. The EHC 10 and the rear catalyst 20 are, for example, three-way catalysts, which are catalysts that remove the three substances of hydrocarbon (HC), carbon monoxide (CO), and nitrogen oxide (NOx) in the exhaust gas at the same time through oxidation-reduction reactions.

The second case 6 also has a tubular shape, and houses a particulate filter 30 that captures particulate substances in the exhaust gas. The particulate filter 30 is, for example, a gasoline particulate filter (GPF) when the internal combustion engine 2 is a gasoline engine, and is a diesel particulate filter (DPF) when the internal combustion engine 2 is a diesel engine.

The first case 5 is of a double-tube structure having an outer tube 5A and an inner tube 5B disposed on an inner side of the outer tube 5A. The EHC 10 and the rear catalyst 20 are housed on an inner side of the inner tube 5B. The EHC 10 is a structure including a base material supporting a catalyst that generates heat when a current is applied, an electrode for applying a current, etc., and is held inside the inner tube 5B by a mat 11 disposed between an outer circumferential surface of this structure and an inner circumferential surface of the inner tube 5B. Similarly, the rear catalyst 20 is held inside the inner tube 5B by a mat 21 disposed between an outer circumferential surface of the rear catalyst 20 and the inner circumferential surface of the inner tube 5B.

The particulate filter 30 is held inside the second case 6 by a mat 31 disposed between an inner circumferential surface of the second case 6 and an outer circumferential surface of the particulate filter 30.

The exhaust gas G1 flowing through the exhaust passage 3 enters the first case 5 and passes through the EHC 10 and the rear catalyst 20, and thereby turns into an exhaust gas G2 from which harmful substances have been removed, before exiting the first case 5. Thereafter, the exhaust gas G2 enters the second case 6 and passes through the particulate filter 30, and thereby turns into an exhaust gas G3 from which particulate substances have been further removed, before being discharged to an outside.

In the EHC 10, to heat the catalyst by the energy of a current applied from a power source, insulation between the electrode and the base material on one side and the case on the other side is secured by an insulation coat 12 applied therebetween. In the example of FIG. 1, the insulation coat 12 is formed so as to cover the entire EHC 10 along the flow direction of the exhaust gas on the inner circumferential surface of the inner tube 5B, as well as cover part of the rear catalyst 20 on the upstream side in the flow direction. On an upper end side of the inner tube 5B in the flow direction, the insulation coat 12 is formed so as to cover the upper end as well as part of an outer circumferential surface of the inner tube 5B on the upper end side.

Thus, the insulation coat 12 is disposed between an inner wall of the first case (an inner circumferential surface of the outer tube 5A) and an outer circumference of the EHC 10 so as to surround the outer circumference of the EHC 10. The insulation coat 12 is formed so as to surround the outer circumference of the EHC 10 and extend to at least part of the rear catalyst 20 on the upstream side in the flow direction. Alternatively, the insulation coat 12 may be configured to be provided over the entire inner circumferential surface of the inner tube 5B and cover the entire rear catalyst 20 in the flow direction.

In the first case 5, a constricted part 5C is provided at an end portion on the downstream side in the flow direction of the exhaust gas. For example, as shown in FIG. 1, the constricted part 5C is formed integrally with the outer tube 5A of the first case 5, and is formed so as to reduce the inside diameter of the outer tube 5A of the first case 5 along the flow direction. The inside diameters of the first case 5 and the second case 6 are larger than the inside diameter of the exhaust passage 3 at other portions. The inside diameter of an end portion of the constricted part 5C on the downstream side is set to the same size as at other portions of the exhaust passage 3, which brings the inside diameter of the exhaust passage 3 on the downstream side relative to the first case 5 back to its original size.

In the internal combustion engine 2 according to this embodiment, the exhaust passage 3 and the intake passage are connected to each other by an exhaust gas recirculation (EGR) passage 7. Through the EGR passage 7, the exhaust gas is guided from the exhaust passage 3 to the intake passage.

In particular, in this embodiment, the EGR passage 7 is connected to the exhaust passage 3 at the constricted part 5C of the first case 5. Thus, in the exhaust passage 3, part ΔG2 of the exhaust gas G2 having passed through the EHC 10 and the rear catalyst 20 is introduced into the EGR passage 7.

Figure 2A:
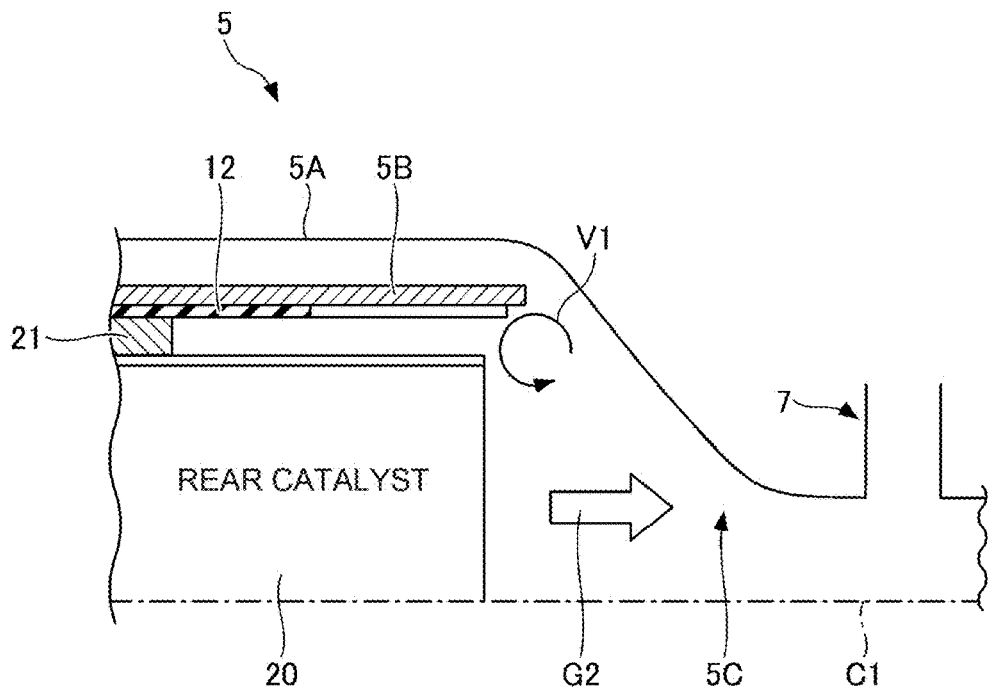
FIG. 2A is a view for describing an effect of a configuration in which an EGR passage is connected to a constricted part.
Figure 2B:
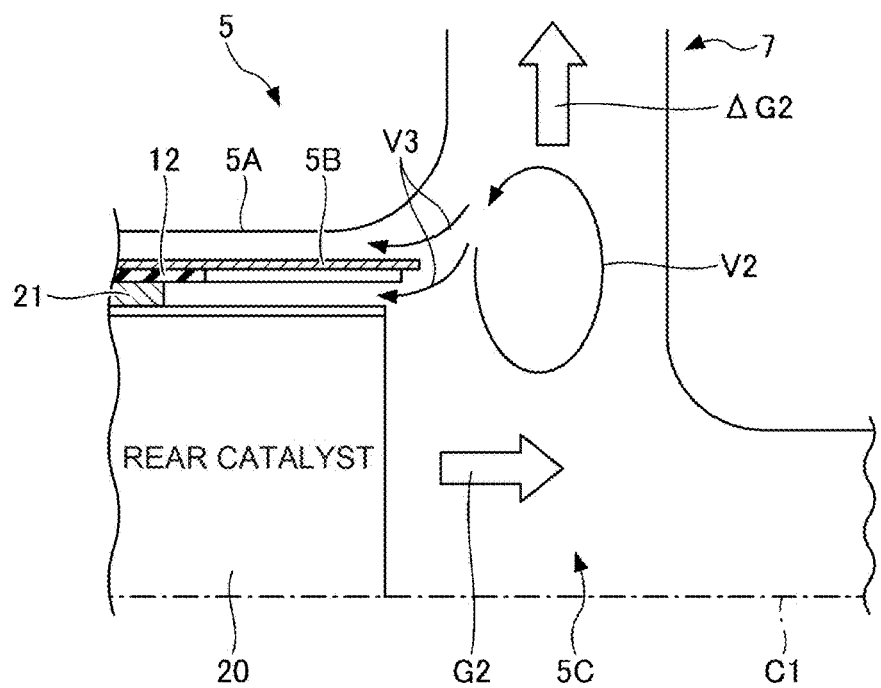
FIG. 2B is a view for describing the effect of the configuration in which the EGR passage is connected to the constricted part.

FIG. 2A and FIG. 2B are views for describing an effect of the configuration in which the EGR passage 7 is connected to the constricted part 5C. FIG. 2A shows, as a comparative example, a flow of the exhaust gas inside the first case 5 in a configuration in which the EGR passage 7 is not connected to the downstream side of the first case 5, i.e., the constricted part 5C. On the other hand, FIG. 2B shows a flow of the exhaust gas inside the first case 5 in the configuration of this embodiment, i.e., the configuration in which the EGR passage 7 is connected to the constricted part 5C.

As described above, in the EHC 10, to heat the catalyst by the energy of a current applied from the power source, insulation between the electrode and the base material on one side and the case on the other side is secured by the insulation coat 12 applied therebetween. However, conventional EHCs have a problem that the insulation performance degrades as soot generated during cold start of an engine gradually builds up on the insulation coat. As a solution to this problem, a structure in which a labyrinth shape is devised so as to make it difficult for soot to adhere has been hitherto successfully adopted on the upstream side of the EHC. On the downstream side, however, the same measure as on the upstream side cannot be taken, and thus there is room for improvement to inhibit adhesion of soot.

Here, to inhibit adhesion of soot on the downstream side relative to the EHC 10, it is desirable that the high-temperature exhaust gas G2 having been heated by the EHC and passed through the rear catalyst 20 be able to enter a gap between the outer tube 5A and the inner tube 5B of the first case 5 and a gap between the inner tube 5B and the rear catalyst 20. In the comparative example shown in FIG. 2A, however, a vortex V1 of the exhaust gas G2 occurs near an end surface of the rear catalyst 20 on the downstream side, and this vortex V1 gets in the way and makes it difficult for the exhaust gas G2 to enter these gaps.

As a solution to this conventional problem, this embodiment adopts the configuration in which the EGR passage 7 is connected to the constricted part 5C, so that, as shown in FIG. 2B, the part ΔG2 of the exhaust gas G2 flows into the EGR passage 7, which results in a different flow of the exhaust gas G2 from that in the comparative example.

The exhaust gas ΔG2 flows mainly toward a radially outer side of the first case 5. For such an exhaust gas ΔG2 to occur, part of the exhaust gas G2 flowing toward the downstream side needs to change its flow direction by, for example, hitting an inner wall of the EGR passage 7. Thus, it is speculated that a vortex V2 flowing toward the upstream side occurs at a junction between the constricted part 5C and the EGR passage 7. This vortex V2 is larger than the vortex V1 shown in FIG. 2A.

As shown in FIG. 2B, it is speculated that this vortex V2 causes a gas flow V3 toward the upstream side near a radially outer edge of the first case 5. Since the vortex V2 is larger than the vortex V1 occurring near the end surface of the rear catalyst 20 on the downstream side, this flow V3 can enter the gap between the outer tube 5A and the inner tube 5B of the first case 5 and the gap between the inner tube 5B and the rear catalyst 20 without being hindered by the vortex V1. As a result, the high-temperature exhaust gas penetrates to the insulation coat 12 around the rear catalyst 20, so that soot can be actively reduced to recover insulation performance.

The vehicle 1 of this embodiment includes: the EHC 10 which is provided in the exhaust passage 3 of the internal combustion engine 2 and of which the temperature can be raised by application of a current; the tubular first case 5 housing the EHC 10; the insulation coat 12 disposed between the inner wall of the first case 5 and the outer circumference of the EHC 10 so as to surround the outer circumference of the EHC 10; the constricted part 5C that is provided at the end portion of the first case 5 on the downstream side in the flow direction of the exhaust gas to reduce the inside diameter of the first case 5 along the flow direction; and the EGR passage 7 connected to the constricted part 5C. The vehicle 1 further includes the rear catalyst 20 that is housed inside the first case 5 and disposed on the downstream side in the flow direction of the exhaust gas relative to the EHC 10. The insulation coat 12 surrounds the outer circumference of the EHC 10 and extends to at least part of the rear catalyst 20 in the flow direction.

This configuration can create an exhaust gas flow that enters the gap between the first case 5 and the insulation coat 12 and the gap between the insulation coat 12 on one side and the EHC 10 and the rear catalyst 20 on the other side, making it possible to reduce soot near the insulation coat 12 by the high-temperature exhaust gas. As a result, degradation of the insulation properties of the EHC 10 can be inhibited. Placing the rear catalyst 20 in the vicinity of the EHC 10 can promote warming-up of the rear catalyst 20 as well as make the installation space smaller.

As shown in FIG. 1, FIG. 2A, and FIG. 2B, it is preferable that the EGR passage 7 be disposed such that the direction of an axis C2 at a junction with the constricted part 5C is orthogonal to the direction of an axis C1 of the first case 5 (exhaust passage 3). This configuration can make the exhaust gas G2 flowing toward the downstream side more likely to hit the inner wall of the EGR passage 7 and thereby make the vortex V2 and the flow V3 on the upstream side more likely to occur.

However, the direction of the axis C2 of the EGR passage 7 need not be necessarily orthogonal to the direction of the axis C1 of the exhaust passage 3. As long as the exhaust gas G2 flowing toward the downstream side can hit the inner wall of the EGR passage 7, the direction of the axis C2 of the EGR passage 7 may be a direction other than the orthogonal direction, for example, a direction inclined toward the upstream side (the left side in the views) relative to the axis C2 shown in FIG. 1, FIG. 2A, and FIG. 2B.

Figure 3:
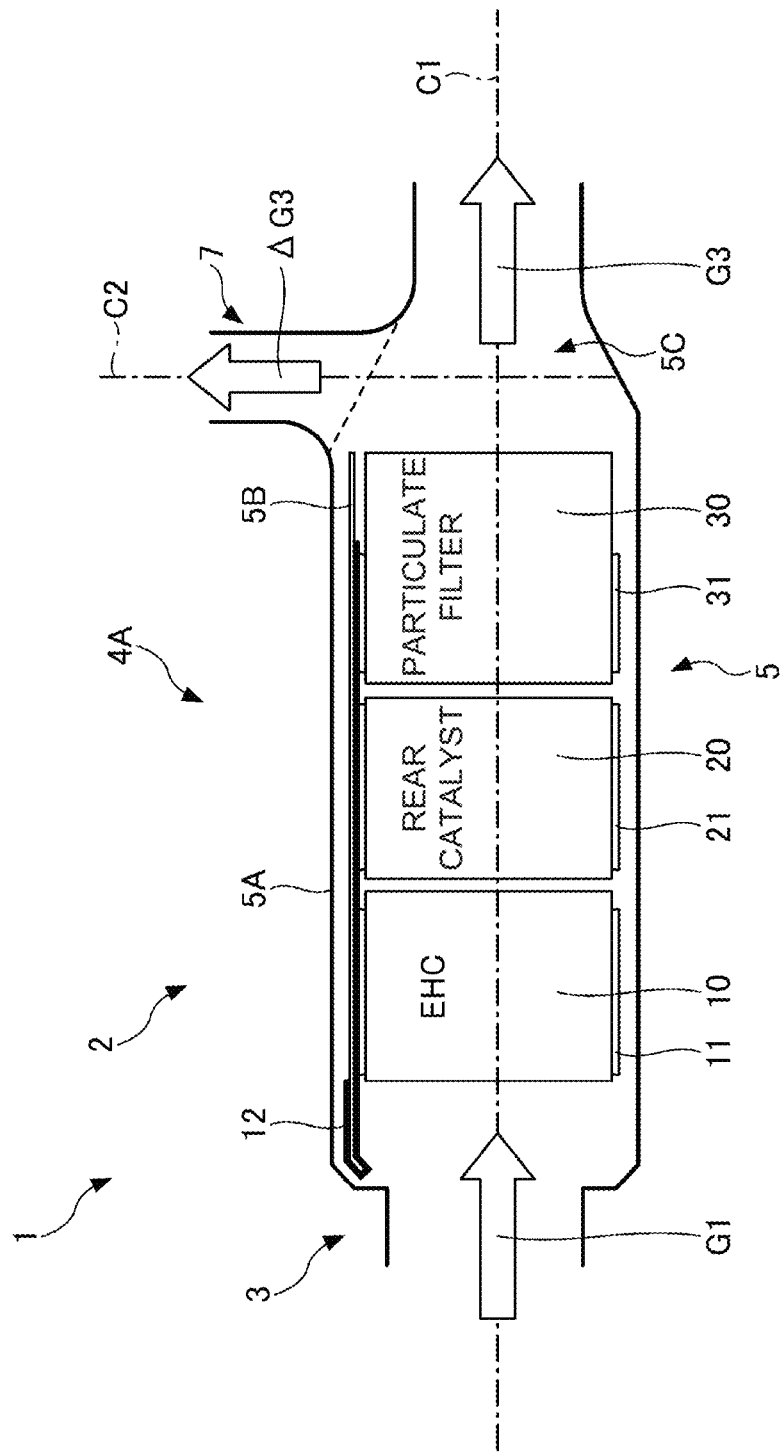
FIG. 3 is a view showing a modified example of a catalytic converter.

FIG. 3 is a view showing a modified example of the catalytic converter. As shown in FIG. 3, a configuration may be adopted in which a catalytic converter 4A has only a single first case 5, and inside the first case 5, the EHC 10, the rear catalyst 20, and the particulate filter 30 are disposed in this order from the upstream side in the flow direction of the exhaust gas.

In the configuration of FIG. 3, the constricted part 5C of the first case 5 is disposed on the downstream side of the particulate filter 30. Thus, part ΔG3 of the exhaust gas G3 resulting from the exhaust gas G1 flowing through the exhaust passage 3 into the first case 5 and then passing through the EHC 10, the rear catalyst 20, and the particulate filter 30 is introduced into the EGR passage 7 at the constricted part 5C.

Also in this configuration, similarly to the action shown in FIG. 2B, the vortex V2 occurring at the junction between the constricted part 5C and the EGR passage 7 causes the flow V3 of the gas toward the upstream side near the radially outer edge of the first case 5, and this flow V3 can enter the gap between the outer tube 5A and the inner tube 5B of the first case 5 and the gap between the inner tube 5B and the particulate filter 30. Thus, as the high-temperature exhaust gas penetrates to the insulation coat 12 near the particulate filter 30, soot can be actively reduced to recover insulation performance. As a result, degradation of the insulation properties of the EHC 10 can be inhibited. Since the EHC 10, the rear catalyst 20, and the particulate filter 30 are collectively housed inside the single first case 5, the catalytic converter 4A can be made compact compared with the configuration having the first case 5 and the second case 6 illustrated in FIG. 1, FIG. 2A, and FIG. 2B.

While the configuration in which the EHC 10 and the rear catalyst 20 are housed inside the first case 5 has been illustrated in the example of FIG. 1, FIG. 2A, and FIG. 2B and the configuration in which the EHC 10, the rear catalyst 20, and the particulate filter are housed inside the first case 5 has been illustrated in the example of FIG. 3, a configuration in which only the EHC 10 is housed in the first case 5 may be adopted. In this case, the rear catalyst 20 and the particulate filter 30 are housed in another case disposed on the downstream side in the exhaust gas flow direction relative to the first case 5. In this configuration, the constricted part 5C of the first case 5 is disposed on the downstream side of the EHC 10. Thus, part of the exhaust gas resulting from the exhaust gas G1 flowing through the exhaust passage 3 into the first case 5 and then passing through the EHC 10 is introduced into the EGR passage 7 at the constricted part 5C.

Since this configuration shares the same configuration in which the EGR passage 7 is connected to the constricted part 5C of the first case 5 as the examples of configurations of FIG. 1 to FIG. 3, similarly to these examples of configurations, this configuration can actively reduce soot on the insulation coat 12 to recover insulation performance and thereby inhibit degradation of the insulation properties of the EHC 10.

The embodiment has been described above with reference to specific examples. However, this disclosure is not limited to these specific examples. Embodiments in which design changes have been made to these specific examples as appropriate by those skilled in the art are also included in the scope of this disclosure, as long as the characteristics of this disclosure are included. The elements included in each of the above-described specific examples and their arrangement, conditions, shapes, etc. are not limited to those illustrated but can be changed as appropriate. The combinations of the elements included in each of the above-described specific examples can be changed as appropriate within such a range that no technical contradiction arises.

What is claimed is:

1. A vehicle comprising:
   an exhaust gas control catalyst which is provided in an exhaust passage of an internal combustion engine, wherein an application of a current raises a temperature of the exhaust gas control catalyst;
   a tubular case having a double-tube structure including an outer tube and an inner tube disposed on an inner side of the outer tube, the inner tube housing the exhaust gas control catalyst;
   an insulation coat disposed between an inner wall of the inner tube and an outer circumference of the exhaust gas control catalyst so as to surround the outer circumference of the exhaust gas control catalyst;
   a constricted part that is provided at an end portion of the case on a downstream side in a flow direction of an exhaust gas to reduce an inside diameter of the case along the flow direction; and
   an exhaust gas recirculation (EGR) passage connected to the constricted part,
   wherein the insulation coat is formed so as to cover an upper end of the inner tube in the flow direction and a part of an outer circumferential surface of the inner tube on the upper end side.

2. The vehicle according to claim 1, further comprising a rear catalyst that is housed inside the case and disposed on the downstream side in the flow direction relative to the exhaust gas control catalyst, wherein the insulation coat surrounds the outer circumference of the exhaust gas control catalyst and extends to at least part of the rear catalyst in the flow direction.

3. The vehicle according to claim 2, further comprising a particulate filter that is housed inside the case and disposed on the downstream side in the flow direction relative to the rear catalyst, wherein the insulation coat surrounds outer circumferences of the exhaust gas control catalyst and the rear catalyst and extends to at least part of the particulate filter in the flow direction.

4. The vehicle according to claim 1, wherein the EGR passage is disposed such that an axial direction at a junction with the constricted part is orthogonal to an axial direction of the case.

5. The vehicle according to claim 2, wherein the case comprises a first case and a second case,
the first case houses the exhaust gas control catalyst and the rear catalyst, and
the second case houses the particulate filter.

6. The vehicle according to claim 3, wherein the case houses the exhaust gas control catalyst, the rear catalyst, and the particulate filter in this order from an upstream side to the downstream side in the flow direction, and the particulate filter is present at a vicinity of the EGR passage and the constricted part.

7. The vehicle according to claim 5, wherein the rear catalyst is present at a vicinity of the EGR passage and the constricted part.

8. The vehicle according to claim 5, wherein the constricted part is present between the first case and the second case, and
a bottom part of the EGR passage present on a side where the second case is present is lower than a bottom part of the EGR passage present on a side where the first case is present relative to an axial direction of the EGR passage.

9. The vehicle according to claim 2, wherein a downstream end of the inner tube in the flow direction extends to a downstream end of the rear catalyst in the flow direction and an upstream of a bottom part of the EGR passage present on a side where the first case is present in the flow direction.

10. The vehicle according to claim 8, wherein a downstream end of the inner tube in the flow direction extends to a downstream end of the rear catalyst in the flow direction and an upstream of the bottom part of the EGR passage present on the side where the first case is present in the flow direction.

* * * * *